G. W. WHITE.
INHALER.
APPLICATION FILED OCT. 15, 1910.
1,036,759.
Patented Aug. 27, 1912.
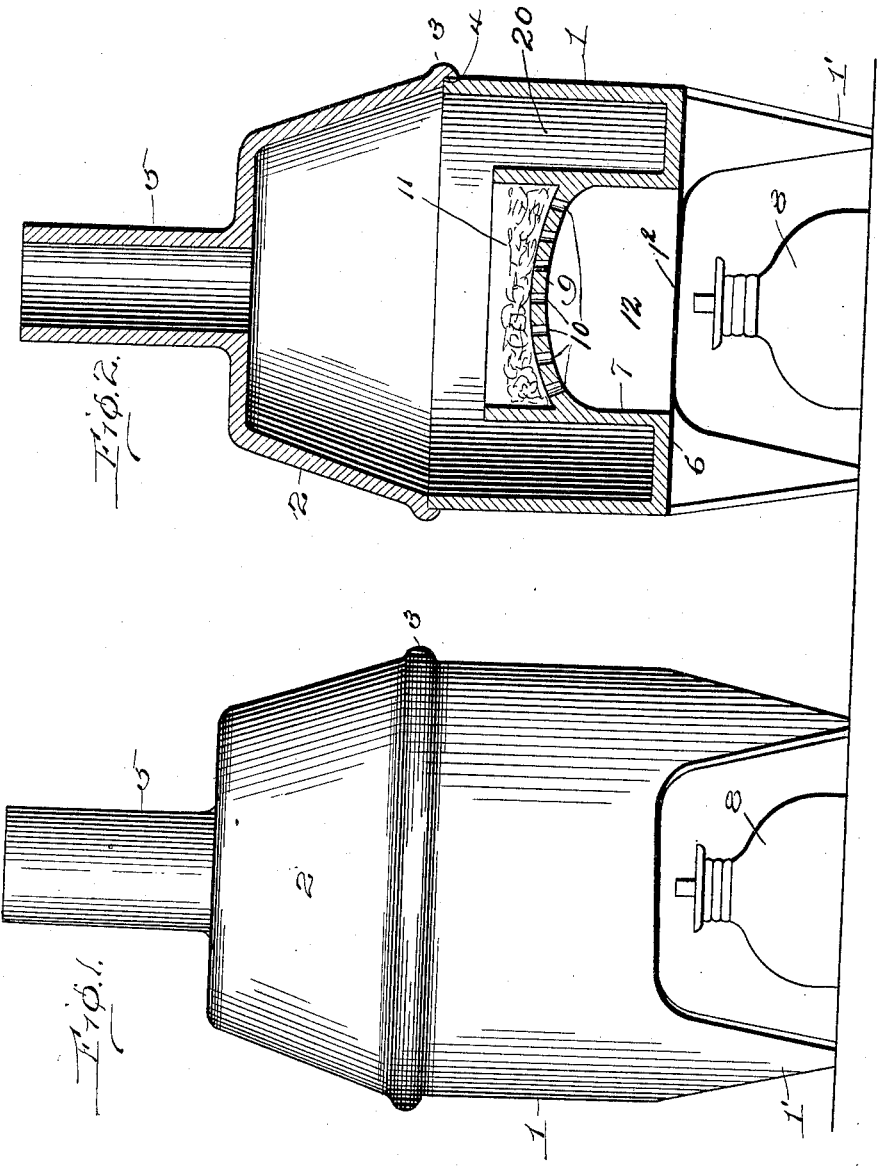

UNITED STATES PATENT OFFICE.

GEORGE W. WHITE, OF SAN ANTONIO, TEXAS.

INHALER.

1,036,759.  Specification of Letters Patent.  Patented Aug. 27, 1912.

Application filed October 15, 1910. Serial No. 587,261.

*To all whom it may concern:*

Be it known that I, GEORGE W. WHITE, a citizen of the United States, residing at San Antonio, in the county of Bexar and State of Texas, have invented certain new and useful Improvements in Inhalers; and I do hereby declare the following to be a full, clear, and exact description of the invention, such as will enable others skilled in the art to which it appertains to make and use the same.

This invention relates to improvements in inhalers, and particularly to inhalers designed to create a vapor and heat the same preparatory to use.

The invention consists in the construction and arrangement of parts, as will be hereinafter described and particularly pointed out in the claim.

In the accompanying drawings: Figure 1 is a side view of an embodiment of the invention. Fig. 2 is a vertical section through the structure shown in Fig. 1.

In constructing an inhaler embodying the invention, the same is preferably made of cast material, as for instance cast iron, and of considerable thickness, so as to retain heat for a considerable time. The inhaler is formed of a body portion and a cap portion, the body portion having positioned therebeneath a burner of any desired kind. The cap is removably positioned on the body portion, and the body portion is arranged with a cup therein having a perforated bottom for permitting the free entrance of heat, and also the flame from the burner, so as to properly act upon the medical preparation placed in the cup, whereby a vapor is created in the device. By the construction of the device of comparatively heavy material the same maintains heat for some considerable length of time, and permits a more or less even distribution of heat to the vapor for thoroughly heating the same, and to a certain extent drying the same before its discharge.

In order that the invention may be more clearly understood an embodiment of the same is shown in the accompanying drawings, in which—

1 indicates a body portion having legs 1' formed integral therewith or rigidly secured thereto. Arranged above and resting on body portion 1 is a cap 2 formed with an overhanging bead 3 for permitting an offset 4. By reason of the offset 4 the interior surface of the walls of the body portion 1 merge into the interior surface of the walls of the cap 2, and as the cap 2 is somewhat conical in shape the vapor in rising is slightly compressed before it passes out the discharge member or nozzle 5.

The inhaler is provided with a body portion 1 having a central opening $1^2$ therein. An annular wall 7 surrounds the opening and extends above the same and is spaced from the wall of the body to provide a heating chamber 20. An arched perforated partition 9 is secured about midway of the annular wall and forming therewith an upwardly extending receptacle 11 which is adapted to receive the medical preparation, the wall below the receptacle providing a heating chamber 12 which accommodates the flame from a heater 8 which communicates with the central opening in the bottom and also communicates with the perforated partition. A cone shaped cap or cover 2 constructed of a diameter approximately the same as that of the body and provided with a bead 3 which contacts with the upper surface of the body to provide an air tight joint therewith to prevent the escape of the fumes from the cover.

In operation when it is desired to use the inhaler the cap 2 is removed and any desired medical preparation is placed in cup 11, after which cap 2 is replaced and burner or heater 8 is lighted. Preferably the burner or heater 8 is arranged so that the flame therefrom will pass into, and somewhat through, apertures 10, so that the flame may contact with the medical preparation in the cup. By burning and by heating the medical preparation the same is caused to give off fumes or vapors which escape eventually out of discharge nozzle 5. The heater 8 not only causes considerable heat to be applied directly to cup 11, but heats the entire device to a greater or less extent, so that the fumes or vapors are kept warm even after the burner has been turned out or removed. By the structure set forth little air mixes with the fumes or vapors, so that the device discharges substantially pure unadulterated medical vapors, which may be inhaled to the desired extent and thus apply the preparation at the desired point without distributing the medicine to the system through the blood.

What I claim is:

An inhaler comprising supports with a body portion thereon having a bottom with a central opening therein, an annular wall surrounding the opening and extending above the same, and spaced from the wall of the body to provide a heating chamber, an arched perforated partition secured midway of the annular wall and forming therewith an upwardly extending cup receptacle, the wall below the cup providing a heating chamber communicating with the opening in the bottom of the body and also communicating with the perforated partition, a cone shaped cap or cover constructed of a diameter approximately the same as that of the body, and provided with a circumferential band and a discharge nozzle on the cap having communication with the cap and with the body.

In testimony whereof I affix my signature in presence of two witnesses.

GEORGE W. WHITE.

Witnesses:
A. A. ZIZIK,
JOE M. ZIZIK.

Copies of this patent may be obtained for five cents each, by addressing the "Commissioner of Patents, Washington, D. C."